*Sylvester & Brooks.*
*Reaming Tool.*
Nº 71339  Patented Nov. 26, 1867.
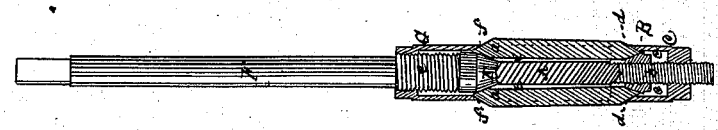
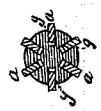
Witnesses
S. N. Piper
Jas. L. Mullen
Inventor:
C. E. Sylvester & J. Brooks
by their attorney
R. H. Eddy

United States Patent Office.

CHARLES F. SYLVESTER AND JOHN BROOKS, OF NORTH BRIDGEWATER, MASSACHUSETTS.

Letters Patent No. 71,339, dated November 26, 1867.

IMPROVED REAMING-TOOL.

The Schedule referred to in these Letters Patent and making part of the same.

TO ALL PERSONS TO WHOM THESE PRESENTS MAY COME:

Be it known that we, CHARLES F. SYLVESTER and JOHN BROOKS, of North Bridgewater, in the county of Plymouth, and State of Massachusetts, have invented an Improved Reaming-Tool or Mechanism; and we do hereby declare the same to be fully described in the following specification, and represented in the accompanying drawings, of which—

Figure 1 is a side view,

Figure 2 a longitudinal section, and

Figure 3 a transverse section of it.

In such drawings, A denotes a cylinder or cutter-carrier, formed with a series of radial grooves, $g$, to receive a series of reaming-cutters, $a\ a\ a$, &c., which are disposed within the carrier at equal distances apart, the grooves running lengthwise of the cylinder or carrier. Projecting from one end of the grooved cylinder or carrier A is a male screw, $b$, on which is screwed a cone, B, with its smaller end next to the end of the cylinder A. A clamp-nut, C, is also screwed upon the screw $b$, such nut being formed with a chamber, $c$, to receive the cone B. This chamber has a conical mouth, $d$, to receive and fit upon the bevelled ends of the series of cutters, each of such cutters being formed angular or wedge-shaped at each of its ends, in manner as shown in fig. 2. The several cutters rest on the cone B, and also on a stationary cone, E, extending from the opposite end of the cylinder or cutter-carrier A, the smaller base of the cone E being joined to the said cylinder. From the larger base of the cone, a shank or shaft, F, projects, and has a male screw, $e$, cut upon it next to the larger base of the cone E. The several cutters rest upon the cone E, and are held therein by means of a clamp, G, which is screwed upon the screw $e$, and formed with a conical recess, $f$, to receive and embrace the ends of the cutters, in manner as shown in fig. 2.

By screwing the cone B toward the cutters, and in a like degree unscrewing the nut G, the several cutters will be moved upon the two cones B and E, in a manner to cause each of such cutters to be pressed laterally away from the axis of the cylinder A. In this way the series of cutters may be expanded, as the operation above mentioned will force them to simultaneously ascend both the cones. After any such expansion of the series, the cutters may be clamped in their positions by means of the two nuts C and G. The cutters may be expanded at one end of the series more than at the other, in order to adapt them for reaming a tapering hole.

From the above, it will be seen that the series of cutters may be readily adjusted, as occasion may require, for effecting by them the reaming of either a cylindrical or a tapering hole in a piece of metal or other material. In order to use the reaming-tool, its cutters are to be placed within the hole to be reamed, and the shank of the tool is to be revolved so as to cause the several cutters to enlarge the hole.

We claim the expansive reamer, as composed of the slotted tool-carrier A, the series of cutters $a$, the stationary cone E, the adjustable cone B, the screws $b$ and $e$, and the clamp-nuts C and G, and the shank F, arranged, combined, and constructed in manner and so as to operate substantially as explained and represented.

CHAS. F. SYLVESTER,
JOHN BROOKS.

Witnesses:
CHANDLER SPRAGUE,
WM. H. AUSTIN.